Sept. 8 1970 JEAN-PIERRE PEYROT 3,527,917
METHOD OF ELECTRON BEAM WELDING ON THICK METAL SHEETS
Filed April 19, 1968 2 Sheets-Sheet 1
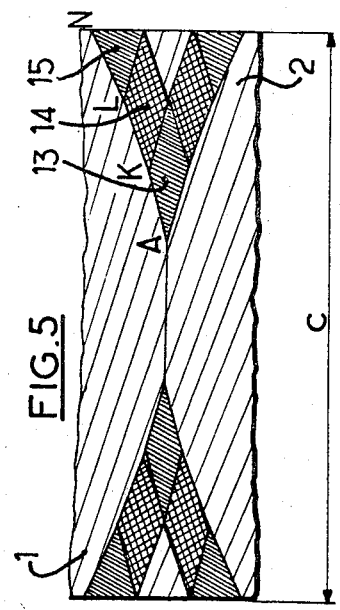
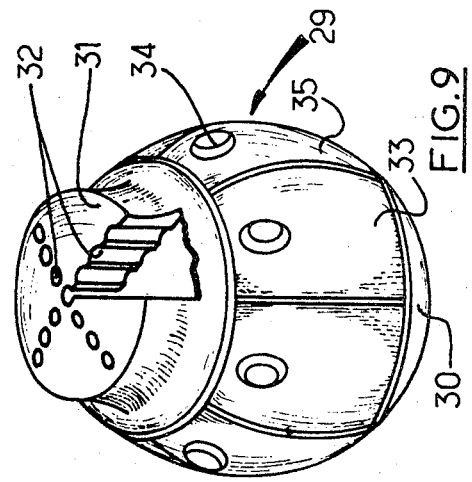
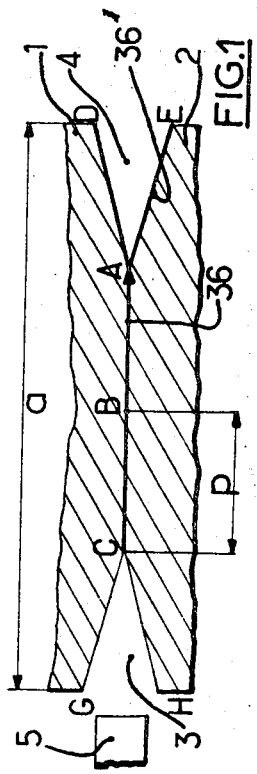
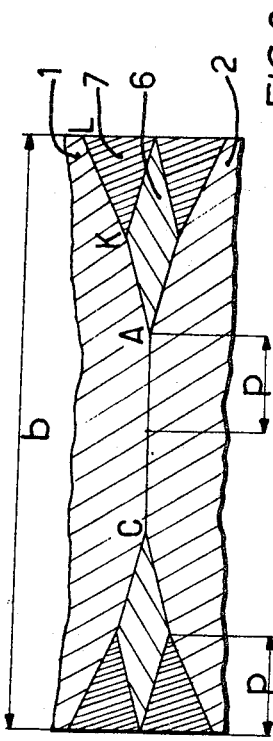
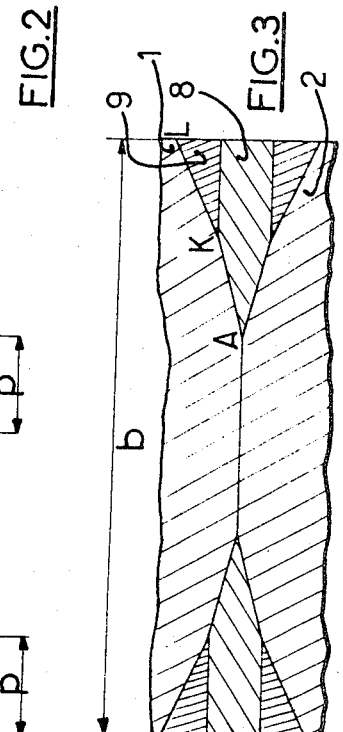
Inventor:
Jean-Pierre Peyrot
By
Karl W. Flocks
Attorney United States Patent Office 3,527,917
Patented Sept. 8, 1970

3,527,917
METHOD OF ELECTRON BEAM WELDING ON THICK METAL SHEETS
Jean-Pierre Peyrot, Villejuif, France, assignor to Clover, Villejuif, Val-de-Marne, France, a joint-stock company of France
Filed Apr. 19, 1968, Ser. No. 722,796
Claims priority, application France, Apr. 28, 1967, 104,761
Int. Cl. B23k *15/00*
U.S. Cl. 219—121                      10 Claims

ABSTRACT OF THE DISCLOSURE

Method of manufacture by electronic welding on thick metal sheets, the thickness of which is greater than twice the maximum penetration depth of the electron gun which comprises the following steps: preparing an intermediate surface which is to be welded by welding edge to edge at the centre of the two surfaces to be assembled, the thickness of the said weld being less than twice the said penetration depth; preparing a chamfer at each extremity of the said weld; carrying out a welding pass across each free space formed by each of the said chamfers so as to assemble together the two said surfaces by electronic welding.

---

The present invention relates to electronic welding of thick metal sheets, and more particularly to its application to an assembly of thick metal sheets, without any limitation as to thickness, while reducing to a very low value the deformation and shrinking after welding, together with the internal stresses which result, and improving the inherent quality of the welds from the point of view of porosity, occlusions and fissuration.

It is known that in all the conventional methods of welding of relatively thick metal sheets, the filler metal is entirely melted; it is added progressively, either manually in the case of welding rods, or automatically in the case of welding with a consumable electrode under a solid or gaseous protection flux, or alternatively under a protection of slag ("electro-slat method").

In these methods, any interruption of the melting of the filler metal results in an inadmissible defect in the weld.

The invention has for its main object a special arrangement of the parts to be welded, permitting welding by beams carrying ionic, electronic or phonic charges characterized by a partial melting of the filler metal which fills in the solid state the chamfers of the parts to be assembled together.

It has also for its object certain other arrangements: the filler metal is added in a noncontinuous manner, it is placed in the joint in the form of profiles of triangular or diamond cross section or of any other geometrical section required by the welding process, while limiting to the minimum the number of sections filling the chamfer, each welding joint having a depth limited to the length of the welding penetration by the charged beam. In the text which follows, reference will be made to electron beams and the electron gun for the sake of clearness.

The invention thus permits electronic welding to be carried out on thick sheets, for example the closure of barrel-plate along a generator line, the connection of hoops to each other, the fixing of tubes passing through a casing by means of circular welds. It is also directed, by way of new industrial products, to the mechanically-welded parts and in particular metallic assemblies such as pressure chambers for the chemical industry, reactor casings, extrusion presses obtained by the method of welding according to the invention.

Other characteristic features and advantages will be brought out in the description which follows below with reference to the accompanying drawings and giving by way of indication but not in any limitative sense, several forms of embodiment of the invention.

In the drawings:

FIG. 1 is a view in cross section of an assembly of two thick sheets by the method of welding according to the invention;

FIGS. 2, 3 and 4 are sectional views of welds similar to that of FIG. 1;

FIG. 5 is a view of a further alternative form;

FIG. 9 is a view of a welded chamber.

Figure 6:
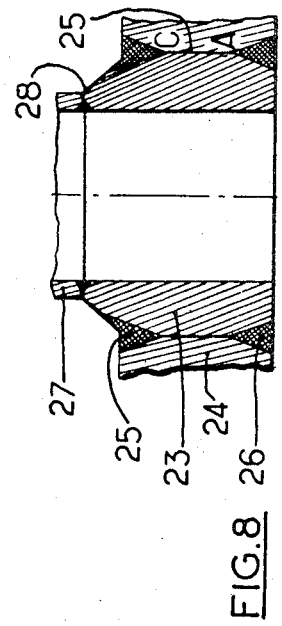
FIG. 6 is a perspective view of the assembly of FIG. 5 during the course of welding.

There are shown in FIG. 1 two thick metal sheets 1 and 2, of which the thickness $a$ is more than twice the practical length of the penetration $p$ of an electron gun. For example, $a=200$ mm. and $p=60$ mm. It is therefore not possible to weld the sheets together edge to edge, and two chamfers 3 and 4 are formed into which the welding beam of the electron gun 5 is directed on each side of the assembly, along the generator lines CB and AB of the surfaces to be welded together.

There are then housed in the chamfers ADE and CGH triangular sections machined accurately from a metal of the same grade as that of the sheets 1 and 2. As the opening angle DAE is less than 60°, the length of the side AD does not reach 60 mm. if $p=50$ mm. and if the limiting length of penetration of the electron gun is equal to 60 mm. for example, it is possible to ensure the melting of the joints AD, AE, GC and HC which terminate the assembly.

The molten zones 36 have a thickness of the order of 1.5 to 3 mm. With stainless steel, it is thus possible to effect the weld by means of an electron gun having a power of about 30 to 40 kw. with a welding speed of the order of 80 cm./min., and under these conditions prefectly sound welds should be obtained without creating deformation, tension or alteration of the metal in the welding zone.

It should be observed that the two passes CB and AB overlap slightly at B. After these first two passes, the point of the leading dihedron at A and C is preferably freshened up by a finishing machining operation.

In FIG. 2, there is shown an assembly of metal sheets having a thickness $b=300$ mm. In this case, the edge to edge weld AC has the same dimensions as in the case of FIG. 1, but two stages of filling the chamfers with filler metal are required, for example a diamond 6 and then two triangles 7.

It will be observed that the points A, K and L are not in line so that in carrying out the pass KA, the charge-carrying beam does not affect the surface KL.

Finally, in the case of FIG. 2, the welding together of two sheets of 300 mm. for example is successfully carried out by means of 14 passes.

In FIG. 3 is shown an alternative form of the solution of FIG. 2, the diamond section 6 being replaced by the pentagon section 8 and the triangles 7 by the triangles 9.

Figure 4:
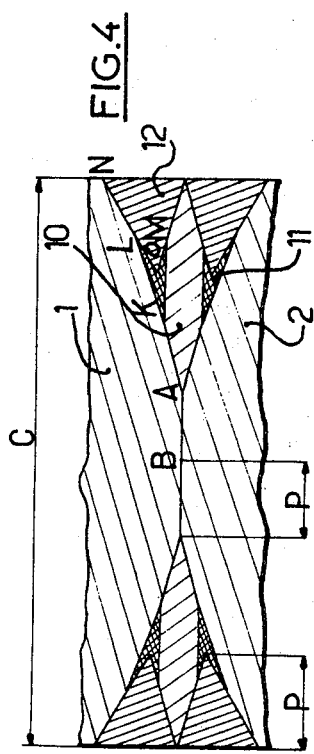

FIG. 4 is a view in cross section of an arrangement corresponding to an assembly of sheets which are still thicker, in which for example $c=400$ mm. In this case the filler metal parts 10, 11 and 12 are adopted. In this case also it will be noted that the compound line AKLM is convex towards the cutaway portion of the chamfer in order that the passes AB, KA, LK and ML can be carried out successively without damaging the surface against which the next following filling element is supported. In this case, 22 passes are required in all.

FIG. 5 is a view of an assembly in which the chamfers are filled with diamond sections 13 and 14 or triangular sections 15. It will be noted that the diamond sections 13 and 14 do not have absolutely the same section due to the fact that the points A, K, L and N are not in alignment.

It can be seen from FIG. 6 how the electron gun 16, supplied by cables 17 and fixed on a trolley 18, is guided at the desired angle along a slide 19 fixed to the sheet 1 by screwing or any other method, so as to carry out the passes indicated in FIG. 5, successively and in the desired order.

The vacuum chamber and the pumping means have not been shown. The parts are wholly contained in a vacuum chamber, or alternatively, a vacuum chamber is constituted locally and is limited to the immediate vicinity of the joint to be welded.

Figure 7:
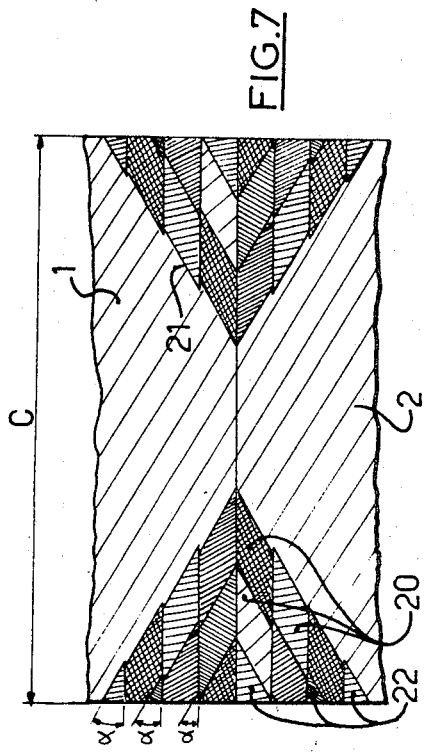
FIG. 7 is a sectional view of an alternative form of the invention with strictly standard elements.

FIG. 7 is a view of an alternative form in which for reasons of standardization and convenience, the diamonds 20 are all strictly identical. In this case, as all the angles "α" are equal, stepped portions 21 are provided at each fresh stage of diamond sections, and the filling is completed by a last stage of triangles 22.

A linear weld of this kind according to the invention can be applied to the closure of barrel plate or hoops along a generator line, and also to the coupling of two groups to each other.

When it is desired to connect a tube on to a thick metal sheet of a pressure vessel (see FIG. 7), in a first operation, the circular part 23 is welded on the thick sheet 24, the weld being made, without filler metal, of the cylindrical parts AC in contact, and then in a second operation the circular filling sections 25 and 26 are welded.

In a third operation, the tube 27 is welded on the part 23 by a conventional method, or even if so required by electronic welding in two passes: an internal pass and an external pass without a filler section.

In the case of welding of two hoops to each other, the circular sections are introduced from the interior of the hoop and, by elastic deformation, their diameter is increased so that they can be put in position inside the chamfer, this being effected for example by means of jacks.

By means of the invention, it is thus possible in particular to produce a large tank intended to contain a high pressure fluid, this tank lending itself readily to transport in separate parts, usually heat treated, from a manufacturing centre to a distant position at which the tank is to be installed. These parts are assembled together to form the tank.

In FIG. 9, a tank of this kind has been shown, the solid elements of which will be welded without deformation according to the present invention.

Figure 8:
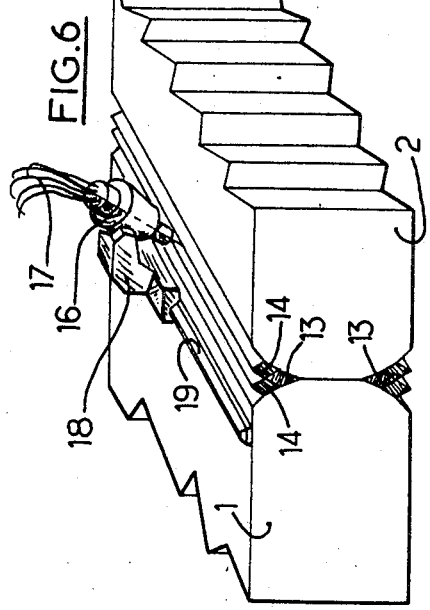
FIG. 8 is a view in cross section of a welded tubular outlet.

The joints are similar to those indicated in FIG. 8, and the welding of the spherical caps 30 and 31 is carried out following the method previously explained. The tank is provided at its upper portion with a certain number of orifices 32.

The elements 33 provided with portholes 34 are welded together in spherical segments 35.

It can be seen that the invention makes it possible to assemble by welding thick sheets or parts of any thickness while being entirely free from any constraint in connection with deformation of the parts, their shrinkage, or their stress-relief after welding. There are thus no preheating precautions to be taken and no annealing requires to be carried out on the welded assembly.

It will of course be understood that the present invention has been described above purely by way of explanation and not in any limitative sense, and that any modifications of detail may be made thereto in conformity with its spirit, without thereby departing from its scope.

I claim:

1. A method of manufacture by electron beam welding on thick metal sheets, the thickness of which is greater than twice the maximum penetration depth of the electron gun, said method comprising the following steps:

preparing an intermediate surface of each sheet which is to be welded by welding edge to edge at the center of the two surfaces to be assembled from opposite sides of the sheets, the thickness of each of said welds being less than twice said depth of penetration;

preparing a chamfer forming a dihedron at the bottom thereof at each extremity of said welds;

carrying out a welding pass across each free space formed by each of said chamfers so as to assemble together said two surfaces by electron beam welding;

cleaning up the dihedron of the bottom of the chamfer which may have been damaged by the execution of said welding pass;

filling the bottom of the chamfer by at least one section, of which the surfaces to be assembled by electron beam welding with a surface for the first pass of welding, and a surface of another section for subsequent passes of welding have a depth which does not exceed said penetration depth;

welding with an electron beam said sections to the walls of the chamfer of said sheets to be assembled for the first pass of welding and with the surface of another section for subsequent passes of welding;

and thus proceeding by stages of filling until the chamfer is entirely filled with sections and the assembly is completed.

2. A method of electron beam welding on thick metal sheets as claimed in claim 1, in which the filler metal intended to fill the chamfer is partly melted by an electron beam in a narrow zone corresponding to the surfaces in contact between two adjacent metallic parts.

3. A method of welding as claimed in claim 1, in which the filling of the chamfer is effected by sections of solid added juxtaposed parts chosen to permit the length of an electron beam to weld individual rows of sections whereby the joint is always accessible to an electron or phonic beam for a depth at least equal to the maximum penetration of said beam.

4. A method of welding as claimed in claim 1, in which said sections comprise a bar having a cross section close to that of a diamond slightly deformed with respect to the strictly parallel piped form of a geometric diamond when intermediate welding passes are carried out.

5. A method of welding as claimed in claim 4, in which said section is a bar of triangular cross section when the last welding passes are effected.

6. A method of welding as claimed in claim 1, in which the welding chamfer is cut with a slope formed by a plurality of slopes of different values, the opening angle of the chamfer increasing progressively in relation to the number of stages already filled by the added parts with which the chamfer is filled.

7. A method of welding as claimed in claim 1, in which said section is a bar of cross section in the form of a parallelogram and the chamfer is stepped out of alignment at each stage.

8. A method of welding as claimed in claim 1, in which said section is a circular ring.

9. A method of welding as claimed in claim 1, in which the surface machining of the sections is provided for filling the chamfer by arranging narrow contact zones between the sections and the chamfer and between each other within the limit of the penetration depth of the electron gun.

10. A method of welding as claimed in claim 1 in which the surfaces comprising the parts to be welded are two pole caps and equatorial quarters, with spherical filling rings utilized between the pole caps and the equatorial quarters, and spherical filling segments utilized between said quarters.

References Cited

UNITED STATES PATENTS

| | | | |
|---|---|---|---|
| 3,165,619 | 1/1965 | Cohen | 219—121 |
| 3,264,004 | 8/1966 | Sciaky | 219—121 |
| 3,319,536 | 5/1967 | Kohl et al. | 219—121 |
| 3,384,308 | 5/1968 | Cupler | 219—121 |
| 3,436,515 | 4/1969 | Sayer et al. | 219—121 |

W. DEXTER BROOKS, Primary Examiner

U.S. Cl. X.R.

219—137